United States Patent Office 3,531,543
Patented Sept. 29, 1970

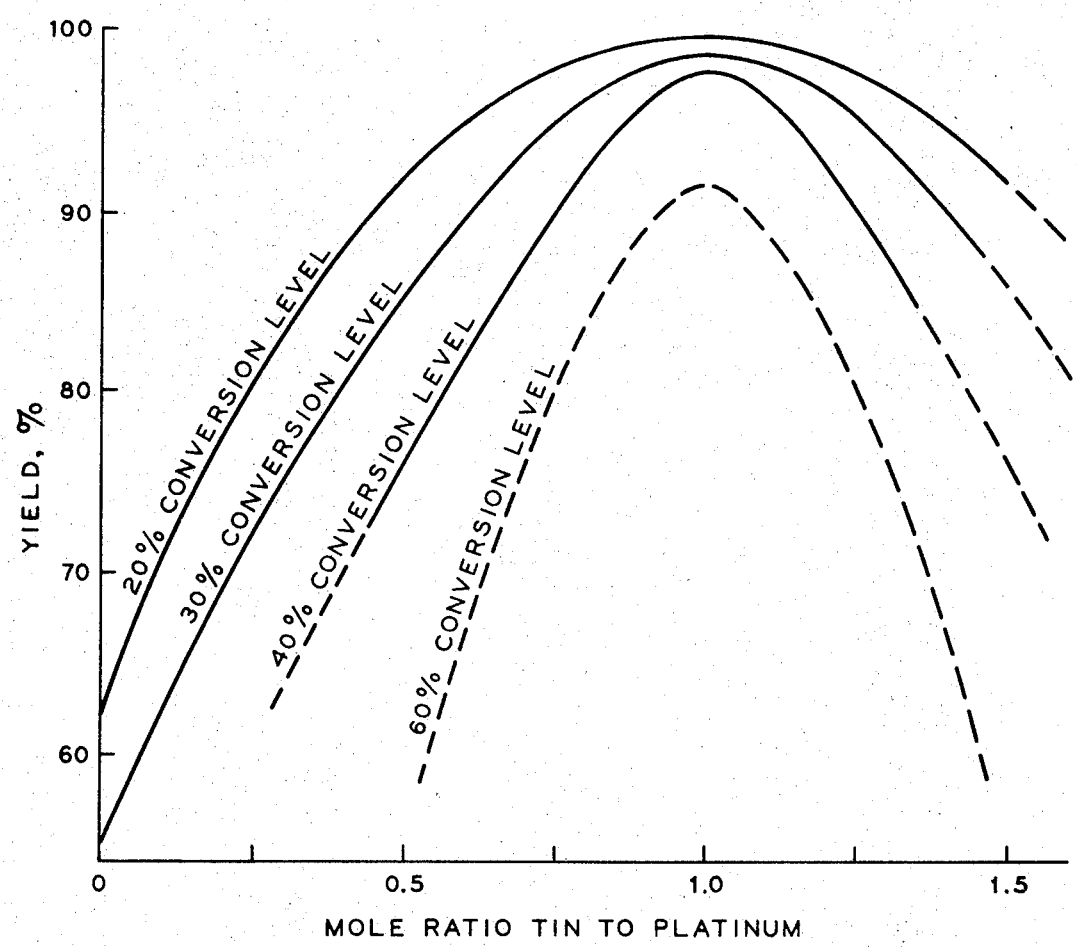

3,531,543
GROUP VIII NOBLE METAL, TIN AND SOLID INORGANIC REFRACTORY METAL OXIDE CATALYST COMPOSITES AND THEIR USE IN HYDROCARBON DEHYDROGENATIONS
Everett Clippinger, San Rafael, and Bernard F. Mulaskey, Pinole, Calif., assignors to Chevron Research Company, San Francisco, Calif., a corporation of Delaware
Filed May 28, 1968, Ser. No. 732,588
Int. Cl. B01j 11/12; C07c 5/18
U.S. Cl. 260—683.3                     19 Claims

ABSTRACT OF THE DISCLOSURE

Composites of a Group VIII noble metal, tin and an inorganic, solid, refractory oxide carrier have excellent dehydrogenation activities and little or no isomerization and cracking activities.

---

This invention relates to the dehydrogenation of vaporized hydrocarbons and more particularly to the dehydrogenation of hydrocarbons catalyzed by composites of Group VIII noble metals, tin and solid inorganic refractory metal oxide carriers. Still more particularly, it relates to novel composites of platinum, tin and neutralized inorganic solid refractory metal oxide carriers and their use in catalyzed hydrocarbon dehydrogenations under dehydrogenation conditions.

It is known in the art that composites of noble metals of Group VIII of the Periodic Table are multifunctional in that they exhibit substantial and concurrent activities which include isomerizing, cracking and dehydrogenation activities in their catalytic action with vaporized hydrocarbons at elevated temperatures. It is also known in the art that isomerization and cracking activities can be inhibited by the use of several expedients. These, however, suffer from certain drawbacks which impair their usefulness including limited catalyst life, catalyst regeneration problems, migration of the modifier from the catalyst during use and the inconvenience and risks involved from the employment of materials such as tellurium, selenium, arsenic and the like which are particularly hazardous to man.

It has now been found that composites of a Periodic Table Group VIII noble metal, tin and a solid, inorganic refractory metal oxide carrier are improved hydrocarbon dehydrogenation catalysts. For each 100 parts by weight of the carrier, the composite should contain from about 0.05 to 5 parts of the noble metal, and for each atom of the noble metal from about 0.001 to 3 atoms of tin. The tin inhibits isomerization and cracking activities normally concurrently experienced in the use of unmodified noble metal composites in the processing of hydrocarbon feeds in the vapor phase at elevated temperatures. The subject tin-containing composites are stable and may be used for long periods of time. Ostensible loss of dehydrogenation activity through slow accumulation of deposits on these catalysts is readily recovered by the use of conventional carbon burn-off cycles. The present catalysts are particularly useful where it is desired to dehydrogenate a hydrocarbon feed with little or no concurrent isomerization or cracking of the feed or product. In this case the refractory metal oxide carrier should be non-acidic and preferably a lithiated alumina.

On the other hand, where it is desired to favor dehydrogenation and yet concurrently effect a moderate degree of isomerization and cracking of a hydrocarbon feed, a composite of a Group VIII metal, containing a relatively minor amount of tin, e.g., from about 0.001 to 0.1 atom per atom of the noble metal, is desirably employed. In this case the refractory oxide support may be non-acidic or acidic depending upon the relative emphasis desired, in particular with regard to the cracking function of the catalyst in the hydrocarbon processing.

In accordance with the present invention a dehydrogenatable hydrocarbon is contacted in the vapor phase with a composite of a Group VIII noble metal, tin, and a refractory metal oxide carrier. Reaction temperatures are in the range from about 850° F. to 1250° F., preferably from about 900° F. to 1150° F. Reaction pressures are in the range below about 3 atmospheres and may be atmospheric or subatmospheric pressure. Preferably the pressure of the hydrocarbon feed is in the range from about 0.1 to 1 atmosphere. For best results, the dehydrogenation is carried out in the presence of added hydrogen gas and for each mol of feed, from about 0.5 to 3 mols of hydrogen should be employed. Higher relative amounts of hydrogen may be used but in general such use is not advantageous.

Gaseous diluents such as nitrogen, methane, water and the like are useful at times, for example as carriers for a particular feed or where it is merely desired to vary the partial pressure of the hydrocarbon feed. Hydrogen can serve both as a diluent and as an inhibitor. It inhibits coke laydown on the instant composites and thus improves the catalyst performance.

In general satisfactory liquid hourly space velocities (the ratio of volume of feed as a liquid at 0° C. and 1 atmosphere pressure per volume of catalyst) should be below about 40, preferably less than 10.

In a preferred embodiment of the invention, isobutane is converted to isobutene using a composite of platinum, tin and lithiated alumina having a surface area of about 60 square meters per gram, particle dimensions in the ⅛″–⅙″ and a mole ratio of platinum to tin of 1 (cf. FIG. 1). For each 100 parts by weight of the alumina the composite contains 0.5 part of platinum, 0.3 part of tin and 0.5 part of lithium. The composite is charged to a fixed bed reactor. Preferably the inner surfaces of the reactor are aluminized, e.g., coated with a thin layer of aluminum metal. The dehydrogenation is effected at a temperature of about 1100° F. Isobutane and hydrogen gas (hydrogen to hydrocarbon mol ratio of about 3) are introduced into the reactor and contacted with the catalyst at an isobutane liquid hourly space velocity of about 1.5 and a system pressure of about one atmosphere. The conversion of isobutane per pass is about 50 percent and the yield of isobutene exceeds 90 percent and usually is 95 percent and higher. Little or none of the product or feed is isomerized. The isobutene obtained in the above process embodiment is particularly desirable for use in the production of polybutene in view of its low n-butene content. n-Butenes are difficult to remove from isobutene, and they adversely affect isobutene polymerizations by short-stopping the polymerization reaction.

The size of the catalyst composites of the present invention will vary in general depending upon the type of use intended and will be conventional to that use, i.e., as for fixed or fluid bed reactors as known in the art, i.e., as large as 0.5 centimeter in diameter and larger and as small as about 100 microns.

Tin in general exhibits a differential inhibitory effect upon the several catalytic activities of the Group VIII noble metals of the Periodic Table when added to their composites with refractory inorganic metal oxide carriers in the manner described herein. In the case of platinum, the tin effect is especially useful in that composites of tin, platinum, and non-acid inorganic refractory metal oxide carriers can exhibit dehydrogenation catalytic activities for hydrocarbons to the virtual exclusion of their otherwise known isomerization and cracking activities. These composites are the most preferred catalysts of the present invention.

Suitable supports or carriers for the preparation of the subject composites are in general inorganic refractory oxides and metal oxides as known in the art as satisfactory supports for Group VIII noble metals, and particularly as known for use as supports for platinum at temperatures below about 1250° F. in a reducing atmosphere, i.e., hydrogen gas and/or a vaporized hydrocarbon. In general these carriers are one or more inorganic oxides from the group of alumina, silica, zirconia, magnesia, hafnia, thoria, titania and boria. The preferred supports will be oxide materials whose intrinsic acidity (cf. Pines and Haag, J.A.C.S. 82, 2471) is substantially neutralized by an alkali metal or alkaline earth metal component, including calcium, magnesium, strontium, cesium, rubidium, potassium, sodium and lithium. The alkali metals and particularly lithium are preferred base components for the subject composites. These bases in general neutralize or minimize the acidity function(s) of the carriers and the instant composites which tend to promote hydrocarbon cracking reactions. The basic component may be present as part of a preformed carrier or the carrier component may be impregnated with the base component at the time the platinum and/or tin components are deposited on the carrier. Alumina is preferred for use herein.

Where the desired catalytic activity of the subject composites is predominantly for dehydrogenation, the surface area of the carrier should be less than about 150 square meters per gram and preferably in the range from about 20 to 100 square meters per gram.

The amount of the Group VIII noble metal which can be effectively disposed upon a suitable carrier varies depending usually upon the surface area of the carrier. In general this amount will be less than about 5 parts by weight per 100 parts of the supporting oxide material. The high cost of the noble metal is a prime consideration. Preferably from about 0.1 to 2 parts of platinum per 100 parts of the carrier is used.

The amount of tin present in the composite per mol (atom) of the noble metal varies depending upon the noble metal and the hydrocarbon feed with which the catalyst is to be employed (vide infra). In general, less than 3 mols of tin per mol of the noble metal should be used. As the ratio exceeds 1:1, the yields of the dehydrogenation product decline as does also the dehydrogenation activity. Useful dehydrogenation conversions and yields are indicated (cf. FIG. 1) when this ratio is as high as 1.5–2.5 to 1 and as low as about 0.25 to 1. On the other hand, where substantial concurrent cracking and isomerization is desired, use of ratios of tin to noble metal in the range below 0.5–0.75 to 1 is preferred.

The amount of tin desirably used in the subject composites also varies depending upon the type of hydrocarbon feed. Thus for branched chain alkanes in general best results are achieved when the mol ratio of tin to noble metal, and particularly for the platinum composites, is in the range of 0.75–1.25 to 1, respectively, while for normal alkanes the range is 0.1–0.5 to 1.

For the preferred neutralized inorganic oxide carriers and composites, the amount of the basic component which should be present varies depending upon the particular carrier. It should be sufficient to neutralize the intrinsic acidity of the material. An excess does not appear to be particularly deleterious. In general a satisfactory amount is in the range from about 0.001 to 0.2 equivalent of the base per 100 grams of the carrier.

The catalytic composites of the present invention are most conveniently prepared from halogen free compounds of the Group VIII noble metals and tin. Compounds containing halogen may also be used provided that the halogen, usually chloride, is efficiently removed from the composite. In the preparation the carrier is impregnated with a noble metal compound, a tin compound, and if desired a base compound. It is then dried and calcined at an elevated temperature and activated by treatment with hydrogen gas at an elevated temperature. The X-ray diffraction patterns of activated composites of tin and platinum suggest that the tin and platinum are in the form of a metal compound or alloy as does likewise the relationship disclosed in FIG. 1.

In the preparation of the catalyst composites of the invention, a single solution containing the several components or precursors thereof is preferably used to impregnate the carrier. For example, in the preparation of a platinum, tin, lithiated alumina composite the solution preferably used is a combination of two separately prepared solutions. One of them is a mixture of water soluble platinum and lithium salts containing one part (weight) of tetraammino platinum dinitrate, 5 parts of lithium nitrate and 60 parts of water. The second solution is prepared by dissolving 0.5 part of stannous oxylate in 25 parts of water and 1.5 parts of oxalic acid and adding sufficient hydrogen peroxide to clarify the otherwise milky solution. The above two solutions are combined and poured onto 100 parts of the alumina carrier in an open vessel. The slurry of solution and carrier is stirred with heating until the solvent is evaporated, leaving the solute mixture homogeneously disposed upon the alumina. The residual solvent is removed by heating the composite at a temperature of about 212–302° F. until little or no water is evolved, usually 1–2 hours. The temperature is then increased to effect calcination. Best results are achieved in terms of ultimate catalyst activity, by heating the impregnated carrier to about 1000° F. in a schedule in which there is a holding period of about one hour each at about 600° F., 800° F., and 1000° F. The calcined and impregnated carrier is then activated prior to use by treatment with hydrogen gas at a temperature in the range from about 600° F. to 1250° F. Usually this is most conveniently accomplished in situ in the dehydrogenation reactor in which the catalyst is to be used. A period of from about 0.5 to 3 hours is usually sufficient for the activation.

While the use of a single solution in the catalyst preparation as described above is in general most convenient, separate solutions and intervening drying steps can also be employed with satisfactory results. On the other hand, calcination should only be carried out after both the noble metal and the tin compounds have been applied to the carrier. Where separate solutions are applied individually to the carrier, the solvent used may be water or an inert organic solvent.

The noble metal and tin compounds used for the impregnation are heat-decomposable salts or complex compounds, and in the calcination, decomposition occurs in which volatile fragments are evolved leaving a hydrogen-reducible residue, usually the metal oxide, on the carrier.

Surprisingly, and for reasons not known, the dehydrogenation activity of the subject supported catalysts varies depending roughly upon the time interval between the disposition and drying of the salts on the carrier and the calcination stage. It appears that there is a slow irreversible change in the nature or disposition of one or both of the metallic element species at this stage of the catalyst preparation. The change is manifest in a reduced catalyst activity which may be as much as 30 to 60 percent less than the case in which the calcination immediately follows the disposition and drying. Thus for best results in terms of dehydrogenation activity of the final catalyst composite, the calcination stage should immediately follow the impregnation and drying, i.e., at least within a few hours. After the calcination step in the catalyst preparation, the resulting catalyst precursor is stable, and it may be stored or shipped as such before use.

The preparation of the subject catalyst is otherwise accomplished in accordance with conventional techniques. Thus the carrier and a solution containing the required amount of material to be disposed upon it are placed in a suitable vessel, for example a porcelain evaporating dish, and the solvent is removed by evaporation. The carrier and residual solution is stirred from time to time to insure an even distribution of the components upon the carrier. Aqueous systems are preferred because solvent recovery is not involved in their use. On the other hand, an organic solvent system has advantages. For example, platinum acetylacetonate, lithium nitrate and tetrabutyl tin are all sufficiently soluble, for example in dioxane, such that a single and simultaneous disposition of the catalyst components can be made. Other combinations of organic solvents, hydrocarbyl tin compounds and soluble complex platinum compounds, including the ammino-complexes, are also useful systems for catalyst preparation; however, the acetonate, nitrate, tetrabutyl tin combination is in general the most convenient non-aqueous system.

For the neutralization of the acidity of the carrier and/or composite, the hydroxides of the alkali and alkaline earth compounds noted above may be used. More conveniently, heat-decomposable salts are desirably used. Thus nitrates, oxalates, acetates, carbonates, cyanides and the like can be added to the impregnating solutions where appropriate. Calcination converts them to more basic forms, for example, the oxide, hydroxide etc. and the acidity of the support or composite is neutralized in the ensuing catalyst preparation.

Representative noble metal compounds useful for the preparation of the instant composites include the soluble ammoniated (ammino-type) complex salts of which Pt $(NH_3)_4(NO_3)_2$ is representative; the metal-organic complexes of which platinum acetylacetonate is representative; the halo-metal-acids of which chloroplatinic acid is representative and wherein the halogen is removed from the composite prior to calcination by elutriation, ion exchange, steaming, etc.; and the like heat-decomposable Group VIII noble metal compounds.

Other representative platinum compounds useful for the practice of the invention include $Na_2Pt(CN)_4 \cdot 3H_2O$, $Li_2Pt(CN)_4 \cdot 3H_2O$, $K_2Pt(CN)_4 \cdot 3H_2O$, etc. These compounds contain both the noble metal component and the base metal component of the subject composites and are, therefore, especially useful for the preparation of non-acidic composites.

The noble metal-organic complexes are soluble in general in conventional organic solvents. Thus, where organic solvent recovery and/or handling is convenient, their use may be preferred in combination with organo-metallo tin compounds which are also, in general, soluble in organic solvents or interact with the organic solvent to yield useful soluble tin compounds.

Organometallo compounds of tin are preferred for use in a two step catalyst preparation. These compounds are in general soluble in non-protonic, i.e., inert organic solvents such as hydrocarbons, ethers and the like, a factor which facilitates their application to a support, and they can, in general be used. However, because of cost and as a matter of ready availability, the tetra alkyl tin compounds and in particular the lower ($C_2$–$C_{10}$) tetra alkyl tin compounds are preferred.

Representative useful tin compounds include tetrabutyl, phenyl, ethyl, propyl, octyl, decyl, tin and the like, as well as diphenyl, diethyl, dipropyl, dioctyl, and the like organometallic tin compounds. These compounds may be formulated as follows: $Sn(R)_n$ in which $n$ may be 2 or 4 and R is a hydrocarbon radical containing from 1 to 20 carbon atoms. The several R's in a given compound may be the same or different.

The present catalyst composites are useful for treating vaporized hydrocarbons in general. They are useful in particular for the partial dehydrogenation of these hydrocarbons at a temperature in the range from about 850° F. to 1250° F. provided that the vaporized feed compound contains at least two non-aromatic adjacent carbon atoms having one or two carbon-carbon bonds in common and wherein each carbon atom of the non-aromatic pair have at least one hydrogen atom bonded to it, i.e., dehydrogenatable hydrocarbons by definition. Dehydrogenatable hydrocarbons containing from 4 to 30 carbon atoms, inclusive, are preferred process feeds. Preferred classes of dehydrogenatable hydrocarbons include the n-alkanes; the methyl substituted alkanes, i.e., alkanes whose only branch is a methyl group; the aromatic hydrocarbons containing less than eleven carbocyclic carbon atoms, having only ethyl substituents and containing less than three ethyl substituents; and cyclohexanes of the formula $R_nC_6H_{10}$ wherein R is methyl, ethyl or hydrogen and $n$ is 0, 1, or 2.

In general the products produced in the use of the subject catalyst composites are mono-olefins, i.e., the feed compound less two hydrogen atoms. On the other hand, with recycle, longer contact times and/or more severe reaction conditions, diolefins, aromatic and vinyl aromatic hydrocarbons are also produced as is known in the art. Thus, olefinic hydrocarbon compounds are also useful feeds.

Representative useful hydrocarbon feed compounds which may be effectively dehydrogenated using the present novel catalyst include isobutane, octane, nonane, dodecane, eicosane, triacontane, 2-methylpentane, isooctane, 4-methylhexadecane, cyclohexane, cyclooctane, cyclododecane, ethylcyclohexane, ethylbenzene, 1,4-diethylbenzene, 1,4-diethylcyclohexane, ethylcyclododecane, 2,4-dimethylpentane, butene-1, pentene-2, cyclohexene, α-ethylnaphthalene, octadecane, 1 - methyl - 4 - ethylbenzene, 2-methyl-4-propylhexane, undecane and the like hydrocarbons.

Other representative useful process feeds include petroleum refinery streams such as paraffin wax cuts, isoparaffin fractions, $C_6$–$C_{10}$ saturated hydrocarbon cuts, ethylbenzene concentrates and the like mixtures.

The following examples are included to further illustrate the invention.

EXAMPLES 1-4

A series of catalysts were prepared in the manner described as the preferred embodiment using a neutralized (0.5 weight percent lithium, based upon support) hard alumina as the support, platinum-ammonia-nitrate salt and tetrabutyl tin dissolved in hexane. These catalysts contained 0.5 weight percent of platinum (based upon alumina) and sufficient tin to yield the following tin to platinum mol ratios: 0, 0.5, 1.0, and 1.5. These catalysts were charged to a conventional vapor phase reactor fitted for temperature control, for introduction of feed including hydrogen gas and for withdrawal of products. By varying temperatures in the range 1000 to 1200° F. and feed ratios in the range 1 to 1 to 8 to 1 ($H_2$ to hydrocarbon) yield of isobutene for each catalyst was determined at different conversion levels. These data are summarized in FIG. 1 and show that the catalyst containing a 1 to 1 mol ratio of tin and platinum is unique, possibly a metal compound or complex.

EXAMPLE 5

Isobutane was dehydrogenated using a preferred embodiment of the present catalyst, e.g., a neutralized medium surface area alumina having disposed thereon a platinum-tin composite having a 1 to 1 mol ratio. The feed was a commercial grade isobutane. The reaction conditions were:

| | |
|---|---|
| Temperature, °F. | 1100 |
| LHSV, hr.$^{-1}$ | 3.5 |
| Hydrogen to hydrocarbon ratio, mol | 4 |
| Conversion, percent | 45 |
| Yield of isobutene, percent | 96 |

Product:

| Component | Feed, percent | Product, percent |
|---|---|---|
| $C_1$–$C_2$ | | 0.2 |
| Propane | 0.2 | 0.4 |
| i-Butane | 96.4 | 55.5 |
| n-Butane | 3.3 | 2.5 |
| Propene | | .2 |
| 1-butene | | .5 |
| i-Butene | | 39.5 |
| 2-butene | | 1.2 |

The mol ratio of isobutene to n-butene for the above product was 23.

EXAMPLE 6

When a conventional chrome-alumina or an unmodified platinum catalyst is used to dehydrogenate isobutane using a comparable feed and conditions, a typical product has the following composition:

| Component | Cr–$Al_2O_3$, percent | Pt–$Al_2O_3$, percent |
|---|---|---|
| P$C_1$–$C_2$ | 0 | 9.8 |
| Propene | 0.4 | 8.0 |
| i-Butane | 34.1 | 56.4 |
| n-Butane | 6.0 | 5.4 |
| 1-butene | 14.9 | 1.0 |
| i-Butene | 30.7 | 17.4 |
| 2-butene | 12.1 | 2.0 |

The i-butene/n-butene ratio for the chrome-alumina catalyst was 1.1. The yield of butenes for the unmodified tin catalyst is only 50 percent at a 40 percent conversion, and there is a substantial amount of cracking, i.e., 17.8 percent of $C_1$–$C_3$'s. The isobutene to n-butene ratio was 5.8.

EXAMPLES 7–10

Dodecane was dehydrogenated as in Example 1 above except that the ratio of tin to platinum was as indicated below. Dodecane was vaporized and passed over the catalyst under the following conditions:

Temperature: 850–950° F.
LHSV: 2–16
Volume of $H_2$ to volume of feed: 4–8 with the following results:

| Mol ratio, Sn to Pt | 17 | | .33 | | .5 | |
|---|---|---|---|---|---|---|
| Conversion level | 13 | 16 | 11 | 15 | 11 | 15 |
| Dodecene yeild | 93 | 90 | 92 | 88 | 91 | 87 |

The foregoing demonstrate that a reasonable conversion, i.e., 10–20% and excellent yields, about 90% or more of dodecene are obtainable from dodecane by dehydrogenations using the instant tin modified catalysts.

EXAMPLE 11 n-Butane was dehydrogenated in an isothermal vapor phase reactor at 1050° F. The catalyst used was a commercial low surface area lithium hydroxide treated hard alundum type alumina having disposed thereon 0.5 weight percent platinum and 0.15 weight percent tin (all based upon weight of support). The feed, hydrogen and n-butane in a 4:1 mol ratio, was introduced into contact with the catalyst at an LHSV of 1.2. The conversion of n-butane per pass was excellent, i.e., 34 percent with the following yields based on converted butane:

| Product: | Mol, percent |
|---|---|
| 1-butene | 29.0 |
| 2-butene | 56.6 |
| Isobutene | 0.4 |
| $C_1$–$C_3$ hydrocarbons | 2.4 |
| Butadiene | 2.3 |
| Hydrogen | 9.4 |

EXAMPLE 12 n-Octane was dehydrogenated in an isothermal vapor phase reactor at 850–900° F. The catalyst was the same as Example 5 while the space velocity and hydrogen to hydrocarbon mol ratio were both 3.

| | | |
|---|---|---|
| Temperature, °F | 850 | 900 |
| Conversion per pass, percent | 16 | 24 |
| Product, mol percent: | | |
| $C_1$–$C_7$ | 2 | 2 |
| Octenes | 80 | 54 |
| Octadienes | 4 | 9 |
| Ethylbenzene | 9 | 20 |
| o-Xylene | 5 | 15 |

The complete absence of m- and p-xylenes from the product demonstrates the remarkably low isomerization activity of this catalyst. Thus at low conversion monoolefins can be the major product while at higher conversions aromatics made by ring closure and without isomerization are the major product.

Under similar conditions using the subject composite catalysts, cycloalkanes in general are dehydrogenated to yield olefinic hydrocarbon products in which relatively little or no undesirable isomerization and cracking occurs, and ethylbenzene is efficiently converted to styrene.

It is readily appreciated from the foregoing disclosure and examples that variations can be made by those skilled in the art without departing from the scope and spirit of the appended claims.

We claim:

1. A process for dehydrogenating a hydrocarbon feed selected from the group consisting of dehydrogenatable hydrocarbons which comprises contacting said feed with a catalytic composite of a Group VIII noble metal component, tin, and an inorganic refractory metal oxide carrier selected from the group consisting of alumina, zirconia, magnesia, hafnia, thoria, titania, boria, and mixtures thereof and neutralized inorganic refractory metal oxides at dehydrogenation conditions including a temperature in the range 850 to 1250° F.

2. The process of claim 1 wherein the noble metal component is platinum, the carrier is alumina and said neutralization is effected by lithium.

3. The process of claim 1 further characterized in that said conditions include a liquid hourly space velocity below about 40.

4. The process of claim 1 further characterized in that said catalytic composite consists essentially of alumina, platinum, tin and a component selected from the group consisting of alkali and alkaline earth bases, and for each 100 parts by weight of the alumina contains 0.05 to 5 parts by weight of platinum, and 0.001 to 0.2 equivalents of the base, and for each mol of said platinum from about 0.001 to 3 mols of tin.

5. The process of claim 4 further characterized in that said feed contains from 4 to about 30 carbon atoms.

6. The process of claim 5 further characterized in that the feed is a methyl substituted n-alkane, and the ratio of tin to platinum is in the range 0.75 to 1.25 to 1, respectively.

7. The process of claim 5 further characterized in that the feed is an n-alkane, and the ratio of tin to platinum is in the range 0.1–0.5 to 1.

8. A catalytic composite of alumina, platinum, lithium and tin, wherein in parts by weight for each 100 parts of alumina the composite contains from about 0.05 to 5 parts of platinum and from about 0.001 to 0.2 equivalent of lithium and for each mol of platinum from about 0.001 to 3 mols of the tin component.

9. The catalyst of claim 8 further characterized in that the composite contains from about 0.01 to 2 parts of platinum.

10. The catalyst of claim 8 further characterized in that the mol ratio of tin to platinum in the composite is about 1.

11. The catalyst of claim 8 further characterized in that the mol ratio of tin to platinum in the composite is in the range 0.75–1.25 to 1, respectively.

12. The catalyst of claim 8 further characterized in that the mol ratio of tin to platinum in the composite is in the range 0.1 to 0.5 respectively.

13. The method for the production of a dehydrogenation catalyst consisting essentially of a mixture of tin and platinum disposed upon neutralized alumina, which comprises heating a slurry obtained by adding alumina to an aqueous solution containing tin oxalate, a platinum compound and a lithium compound, thereby evaporating the water from said solution and disposing said compounds upon the alumina; wherein said alumina has a surface area less than about 150 square meters per gram and a particle size diameter in the range below about 0.5 centimeter; wherein said platinum compound is selected from the group consisting of water soluble platinum complex compounds; wherein said lithium compound is selected from the group consisting of lithium nitrate, acetate, cyanide, carbonate and oxalate; wherein for each 100 parts by weight of said alumina said solution contains from about 0.1 to 5 parts of tin plus platinum values, and sufficient lithium salt to substantially neutralize the intrinsic acidity of the alumina; and wherein the ratio of tin to platinum values in said solution is in the range from about 0.01 to 3 mols per mol of platinum; thereafter drying the resulting composite by heating it at a temperature in the range from about 212° F. to 302° F. until little or no water is evolved; calcining the dried composite by heating it to a temperature of about 1000° F., and thereafter activating said composite by heating it in the presence of hydrogen gas at a temperature in the range from about 600° F. to 1250° F. for a period in the range from about 0.5 to 3 hours.

14. The method as in claim 13 wherein said calcination is accomplished in a heating schedule wherein there is a holding period of about one hour each at about 600° F., 800° F. and 1000° F.

15. The composition produced by heating a slurry obtained by adding alumina to an aqueous solution containing tin oxalate, a platinum compound and a lithium compound, thereby evaporating the water from said solution and disposing said solutes upon the alumina; wherein said alumina has a surface area less than about 150 square meters per gram and a particle size diameter in the range below about 0.5 centimeter; wherein said platinum compound is selected from the group consisting of water soluble platinum complex compounds, wherein said lithium compound is selected from the group consisting of lithium nitrate, acetate, cyanide, carbonate and oxalate; wherein for each 100 parts by weight of said alumina said solution contains from about 0.1 to 5 parts of tin plus platinum calculated as the metals, and sufficient lithium salt to substantially neutralize the intrinsic acidity of the alumina; and wherein the ratio of tin to platinum values in said solution is in the range from about 0.01 to 3 mols per mol of platinum; thereafter drying the resulting composite by heating it at a temperature in the range from about 212° F. to 302° F. until little or no water is evolved; and calcining the dried composite by heating it up to a temperature of about 1000° F.

16. The composition as in claim 15 wherein said calcination is effected in a heating schedule having a holding period of about one hour each at about 600° F., 800° F. and 1000° F.

17. Method of producing a dehydrogenation catalyst consisting essentially of a mixture of tin and platinum disposed upon neutralized alumina which comprises wetting the support with a solution of a platinum compound and evaporating the solvent from the support, said solvent being selected from the group consisting of water, organic solvents, and mixtures thereof, and said compound being selected from the group consisting of platinum salts and complexes soluble in water, organic compounds and mixtures thereof; thereby coating said support with from about 0.05 to 1 grain of platinum, calculated as metal, per 100 grams of support; thereafter wetting said coated support with a second solution containing a compound of tin dissolved therein, said tin compound being of the formula $Sn(R)_n$ and mixtures thereof wherein R is a hydrocarbon radical containing from 1 to 20 carbon atoms and $n$ is 2 or 4, said second solvent being selected from the group consisting of inert organic solvents; and evaporating said second solvent from the coated support; thereby coating said support with the resulting composite ixture containing from about 0.01 to 3 mols of tin, calculated as metal, per mol of platinum; calcining said composite by heating it up to a temperature of about 1000° F., thereafter activating the calcined composite by heating it in the presence of hydrogen gas at a temperature in the range from about 600° F. to 1250° F. for a period in the range from about 0.5 to 3 hours.

18. The process for the production of isobutene which comprises contacting isobutane with a catalytic composite consisting essentially of platinum, tin, alumina and lithium wherein in parts by weight for each 100 parts of alumina the composite contains about 0.5 part of platinum, and 0.5 part of lithium and for each mol of platinum about 1 mol of the tin component at a temperature of about 1100° F. and a liquid hourly space velocity of about 1.5.

19. The process for the production of dodecene which comprises contacting dodecane with a catalytic composite consisting essentially of platinum, tin, alumina and lithium wherein in parts by weight for each 100 parts of alumina the composite contains about 0.5 part of platinum, and 0.5 part of lithium and for each mol of platinum from about 0.17–0.5 mol of the tin component at a temperature in the range 850–950° F. and a liquid hourly space velocity in the range 2–16.

References Cited

UNITED STATES PATENTS

| | | | |
|---|---|---|---|
| 2,708,180 | 5/1955 | Fuener et al. | 208—111 |
| 2,785,138 | 3/1957 | Milliken | 252—415 |
| 3,011,920 | 12/1961 | Shipley | 252—472 |
| 3,031,419 | 4/1962 | Hoekstra | 252—442 |
| 3,126,426 | 3/1964 | Turnquest et al. | 260—683.3 |
| 3,168,587 | 2/1965 | Michaels et al. | 260—683.3 |
| 3,291,755 | 12/1966 | Haensel et al. | 252—464 |
| 3,291,855 | 12/1966 | Haensel | 260—683.3 |
| 3,293,219 | 12/1966 | Haensel et al. | 260—683.3 |
| 3,310,599 | 3/1967 | Haensel et al. | 260—683.3 |
| 3,315,007 | 4/1967 | Abell et al. | 260—683.3 |
| 3,325,566 | 6/1967 | De Rosset | 260—677 |
| 3,379,786 | 4/1968 | Bloch | 260—669 |
| 2,861,959 | 11/1958 | Thorne et al. | 252—465 |
| 3,511,888 | 5/1970 | Jenkins | 260—673.5 |

FOREIGN PATENTS 1,003,499    9/1965    Great Britain.

DELBERT E. GANTZ, Primary Examiner

G. E. SCHMITKONS, Assistant Examiner

U.S. Cl. X.R.

252—466, 472

PO-1050
(5/69)

UNITED STATES PATENT OFFICE
CERTIFICATE OF CORRECTION

Patent No. 3,531,543          Dated September 29, 1970

Inventor(s) Everett Clippinger and Bernard F. Mulaskey

It is certified that error appears in the above-identified patent and that said Letters Patent are hereby corrected as shown below:

Col. 2, lines 42-43, [quote] the 1/8"-1/6" [unquote] should read --the range 1/8"-1/6"--

Col. 7, line 35, "$PC_1-C_2$" should read -- $C_1-C_2$ --

Col. 7, line 61, "yeild" should read --yield--

Claim 9, Col. 9, line 6, "0.01" should read --0.1--

Claim 17, Col. 10, line 11, "grain" should read --gram--

Claim 17, Col. 10, line 21, "ixture" should read --mixture--

SIGNED AND
SEALED
MAR 2 1971

(SEAL)
Attest:

Edward M. Fletcher, Jr.
Attesting Officer

WILLIAM E. SCHUYLER, JR.
Commissioner of Patents